US005523763A

United States Patent [19]
Loomis

[11] Patent Number: 5,523,763
[45] Date of Patent: Jun. 4, 1996

[54] SYSTEM AND METHOD FOR COMPACT STORAGE AND TRANSMISSION OF POSITION AND RESIDUAL INFORMATION USABLE IN DIFFERENTIAL GLOBAL POSITIONING

[75] Inventor: Peter V. W. Loomis, Sunnyvale, Calif.

[73] Assignee: Trimble Navigation, Sunnyvale, Calif.

[21] Appl. No.: 277,322

[22] Filed: Jul. 19, 1994

[51] Int. Cl.$^6$ ............................... H04B 7/185; G01S 5/02
[52] U.S. Cl. ............................................ 342/357; 455/12.1
[58] Field of Search ............................ 342/357; 455/12.1

[56] References Cited

U.S. PATENT DOCUMENTS

| | | | |
|---|---|---|---|
| 5,043,736 | 8/1991 | Darnell et al. | 342/357 |
| 5,202,829 | 4/1993 | Geier | 364/449 |
| 5,225,842 | 7/1993 | Brown et al. | 342/357 |
| 5,266,958 | 11/1993 | Durboraw, III | 342/357 |
| 5,323,163 | 6/1994 | Maki | 342/357 |
| 5,359,332 | 10/1994 | Allison et al. | 342/357 |
| 5,359,521 | 10/1994 | Kyrtsos et al. | 364/449 |
| 5,365,447 | 11/1994 | Dennis | 364/449 |

OTHER PUBLICATIONS

"Overview of Differential GPS Method" by Earl G. Blackwell, from Navigation: Journal of The Institute of Navigation, vol. 32, No. 2, Summer 1985.

"Navigation System Integrity Monitoring Using Redundant Measurements" by Mark A. Sturza, from Navigation: Journal of The Institute of Navigation, vol. 35, No. 4, Winter 1988–1989.

"The Global Positioning System" by Ivan A. Getting, from the IEEE Spectrum, Dec. 1993.

*Primary Examiner*—Theodore M. Blum
*Attorney, Agent, or Firm*—Edward B. Weller; Robert P. Sabath

[57] ABSTRACT

A system and method for optimizing data transmission and storage of minimal sets of position, time, and residual information required for differential global positioning involving at least two GPS receiving stations, one of which may be stationary and at least one of which is mobile, with increased accuracy and compactness. The method includes sending or storing minimal and enhanced combinations of information. If the indicated values are stored rather than immediately transmitted, they may be retrieved for subsequent combination with values established at another station which may be stationary or mobile. The invention relates particularly to the enablement and performance of compacted storage and transmission of position-oriented and residual information for GPS systems and methods.

18 Claims, 4 Drawing Sheets

5,523,763

SYSTEM AND METHOD FOR COMPACT STORAGE AND TRANSMISSION OF POSITION AND RESIDUAL INFORMATION USABLE IN DIFFERENTIAL GLOBAL POSITIONING

BACKGROUND OF THE INVENTION

This invention relates to differential global positioning systems (GPS) and methods, and particularly to the enablement and performance of compacted storage and transmission of position-oriented and residual information for use with GPS systems and methods.

Differential GPS systems and methods are generally known. Such systems and methods are summarized in a survey article by Earl G. Blackwell, "Overview of Differential GPS Methods," 32 *Journal of The Institute of Navigation*, (No.2, Summer 1985). The article describes, among other things, how a local GPS reference receiver (RR) can be employed to eliminate common errors in the GPS navigation solution of other nearby receivers. As is well known, GPS systems permit users equipped with suitable receivers to make accurate position, velocity, and time determinations worldwide with reference to GPS satellites (also referred to as satellite vehicles or SV's) which are in 12 hour (19,000 km) orbits about the earth. Such satellites continuously broadcast their identification, position, and time using specially coded signals. The broadcast information unfortunately contains errors composed of the satellite's clock error, errors in the satellite's broadcast ephemeris data, and certain signal propagation delays.

It is well known according to the prior art for a roving mobile vehicle to receive satellite signals for data processing to develop pseudoranges corresponding to a plurality of satellites and to transmit these pseudoranges to a base station or reference receiver for development of an accurate position determination for the roving mobile vehicle. Four pseudoranges from separate satellites are required to provide a 3D solution, according to well known techniques of GPS, which effectively enables elimination of the receiver's clock error. The location of each satellite is obtained according to the procedures of the prior art, using the satellite's ephemeris message to allow the receiver to calculate its position, which is defined in earth centered, earth fixed coordinates. Differential GPS techniques permit the elimination or reduction of certain errors common to first and second separated receivers. In particular, when two receivers are in the same vicinity and these two receivers use the same four satellites, certain common errors can either be removed entirely or they can at least be substantially eliminated.

FIG. 1b shows a block diagram of a GPS receiver 20 according to the prior art. GPS receiver 20 includes an orbit calculation function 22 based upon a ballpark position input 23, an ephemeris data input 24, and a line-of-sight input 25a from a line-of-sight input source 25. The orbit calculation function 22 produces an output range indication 26. Line-of-sight input source 25 further provides a line-of-sight input 25b to an ATMOS function 28 which produces an ATMOS output indication 29. GPS receiver 20 further includes a summation function 30 which is effective for adding range indication 26 and ATMOS indication 29 to produce a summation output indication 31. GPS receiver 20 further includes a subtraction function 32 which is effective for subtracting the summation output indication 31 from each of a plurality of measured pseudoranges (PRs). The subtraction function 32 produces a pseudorange error indication 33 for each measured pseudorange, which may collectively be referred to as PR error indications. Line-of-sight input source 25 further provides a line-of-sight input 25c to a least squares function 35. GPS receiver 20 includes least squares function 35, and least squares function 25 receives as inputs, PR error indications 33 and line-of-sight input 25c. Least squares function 25 is effective for producing a position error indication 36 for each of the input measured pseudoranges. According to the prior art, least squares function 25 produces position error indications 36 according to the relationship, $$\text{POS ERROR} = [(H^T H)^{-1} * H^T] * \text{PRE}$$

where POS ERROR is a particular position error vector corresponding to a selected pseudorange error value; PRE is pseudorange error vector containing pseudorange values for "m" measured satellites; H is a matrix of line of sight and time values for "m" lines of sight, the matrix being in m rows and four columns, the first column comprising the x components for all m rows, the second column comprising the y components for all m rows, the third column comprising the z components for all m rows, and the fourth column comprising all 1's; and each row of the matrix comprising x, y, z coordinates for a particular line of sight for the satellite represented by the corresponding element of the PRE vector, and the last element of each row being the number 1, i.e.:

$$H = |\underline{X}\ \underline{Y}\ \underline{Z}\ 1| = \begin{vmatrix} x_1 & y_1 & z_1 & 1 \\ x_2 & y_2 & z_2 & 1 \\ \cdot & \cdot & \cdot & \cdot \\ \cdot & \cdot & \cdot & \cdot \\ \cdot & \cdot & \cdot & \cdot \\ x_m & y_m & z_m & 1 \end{vmatrix}$$

$$\underline{PRE} = \begin{vmatrix} PRE_1 \\ PRE_2 \\ \cdot \\ \cdot \\ \cdot \\ PRE_m \end{vmatrix}$$

where m is a selected number of lines of sight greater than or equal to four (4) for purposes of the prior art. GPS receiver 20 further includes a summation function 37 which is effective for adding ballpark (i.e., initial estimated) position indications 23 with corresponding position error indications 36 to produce actual position indications 38, and $PRE_i$ is the ith pseudorange error, associated with the "ith" line of sight, in the pseudorange vector.

The pseudoranges are useful information specific to particular satellites. In differential GPS, a position correction is established at a base station based upon particular satellites which provide base station specific pseudoranges and a base station specific position correction. To currently determine the position of a rover or mobile unit, the base station can receive current or historical position information from the rover and can further receive pseudoranges established by the rover. The rover pseudoranges were developed based upon a set of satellites which may or may not overlap with the set of satellites used by the base station. If the base station and the rover did not develop their positions and position corrections based upon the same satellites, either the position developed by the rover or the correction developed by the base station are worthless and must be disregarded or thrown away as useless. However, the base station can recalculate its distance correction based upon the pseudoranges provided by the rover. This is generally more economical than asking the rover to redetermine its position determination based upon a new set of satellites. In the recalculation by the base station, only the rover pseudoranges which correspond to the same set of satellites available to the base station will be employed. This entire process accordingly depends upon the transmission of pseudoranges from the rover to the base station. The transmission of these pseudoranges is non-trivial, because of the large bit-size of a typical pseudorange. For example, the table which follows illustrates the numbers of bits which are transmitted and/or stored in several cases involving more or less satellite vehicles. The table follows:

TABLE A

| NUMBER OF SATELLITE VEHICLE FIXES | TOTAL NUMBER OF BITS OF INFORMATION TRANSMITTED OR STORED PSEUDORANGES (24 BITS/PR) |
|---|---|
| 4 | 96 |
| 5 | 120 |
| 6 | 144 |
| 7 | 168 |
| 8 | 192 |

It may be advantageous to enable the development of position information and position error information which is of increased accuracy and compactness over information which can be produced by the systems and methods of the prior art.

It may be advantageous to enable the transmission of information which is of increased accuracy and compactness from a roving mobile vehicle to a base station for global positioning purposes.

It may be advantageous to enable the storage of GPS information which is of increased accuracy and compactness at a roving mobile vehicle for subsequent GPS processing and analysis.

SUMMARY OF THE INVENTION

The invention herein relates to the compacted storage and/or transmission of position and residual information to enable global positioning determinations to be made more effectively than under prior approaches. The approach of the invention includes receiving GPS signals from at least five satellites. This permits determination of a pseudorange (PR), time, and line-of-sight for each of the GPS satellites. The GPS receiving station has a radio antenna for receiving these signals.

The information received by the GPS receiver is processed according to the invention in order to produce, inter alia, three estimated position components (x, y, and z) and possibly one or more residual values for each satellite for which GPS readings are taken. Under a version of the present invention, the three position components and all of the residual values are transmitted to the base station to enable the pseudoranges for all of the measured satellites to be regenerated. The amount of data contained in the four or more pseudoranges is considerably greater than that contained in the three position components and the residual(s). This permits a substantial reduction in the amount of position-oriented data which may be stored and/or transmitted in the course of GPS information handling processes which are well known. The information sets available for transmission include pseudorange indications or values which can be transmitted between receiving stations to enable differential GPS calculations to establish the position of mobile stations with respect to a known, fixed reference station. The pseudorange information or other position oriented information which is available for transmission or storage is substantial and its transmission or storage consumes a great deal of time and effort because of the many bytes of information involved.

The residual values generated in accordance with this invention require performance of a least squares operation to obtain position information based upon the indicated pseudoranges. Since conventionally, all pseudoranges for monitored GPS satellites may be stored or transmitted at a substantial processing or transmission time cost, the system and method of the invention offers considerable efficiencies, by instead permitting the storage or transmission of three position components, an associated time-tag, and one or more residual values.

Pseudorange error values are produced from pseudorange information for each satellite based additionally upon an assumed or estimated ballpark position value, and line-of-sight information corrected for ephemeris and atmospheric conditions. Based upon these pseudorange error values, position error indications are developed by performing a least squares operation relying upon the corresponding satellite line-of-sight values. For each such position error, a position indication is produced based upon a comparison of corresponding position error indications with the originally assumed or estimated ballpark position. A residual value is then produced based upon the pseudorange errors, position error indications, and lines-of-sight, for each pseudorange error value produced.

Additionally, according to the invention, at least three position indications and at least one residual value are produced, for transmission to another station for local storage. In summary, the invention herein is accordingly directed toward a system and method for optimizing data transmission and storage of minimal sets of position, time, and residual information required to perform differential global positioning involving two or more stations, with increased accuracy and compactness. The method invented includes sending or storing minimal and enhanced combinations of information, such as at least three position indications with one or more residual values, or alternatively with the one or more residual values, either at least three position error indications or three pseudorange values, each of the latter including corresponding line-of-sight information. If the values are stored, they may be retrieved for subsequent combination with values established at another station.

According to one version of the invention, a GPS position determination system for determining the position of a mobile GPS receiving station includes a mobile GPS receiver for receiving GPS signals from at least five GPS signal transmitting satellites at a mobile GPS receiving location. The mobile GPS receiver produces a line-of-sight for each of said at least five GPS signal transmitting satellites based upon GPS signals received from said at least five GPS signal transmitting satellites. The position determination system of the invention includes a pseudorange generator for producing pseudorange values for each of said at least five GPS signal transmitting satellites from corresponding ones of said GPS signals. It includes a computer for producing pseudorange error values corresponding to the pseudorange values, based upon an initial estimated position of said mobile GPS receiving location. This computer may include a microprocessor. Alternatively, it may be a general purpose computer or a personal computer, or a specialized computation device custom made for the indicated application. The computer is effective for developing position error indications by a least squares operation for each pseudorange error value, and for producing a position indication for each position error indication produced, based upon a comparison of said position error indications with the initial estimated position. Additionally, the computer is effective for producing a residual value for each of said at least five GPS signal transmitting satellites, based upon corresponding ones of said pseudorange errors, position error indications, and lines-of-sight. The position determination system may further include a transmitter for transmitting position and residual indications to a second GPS receiving location. The system may further include storage memory for securing the information locally instead of transmitting it immediately. Storage and memory provisions can be RAM memory for example, disk storage, magnetic, or optical.

These and other features and advantages of the present invention will become apparent upon reading the following detailed descriptions and studying the various figures of the drawings.

DETAILED DESCRIPTION OF THE PREFERRED EMBODIMENTS

Figure 1A:
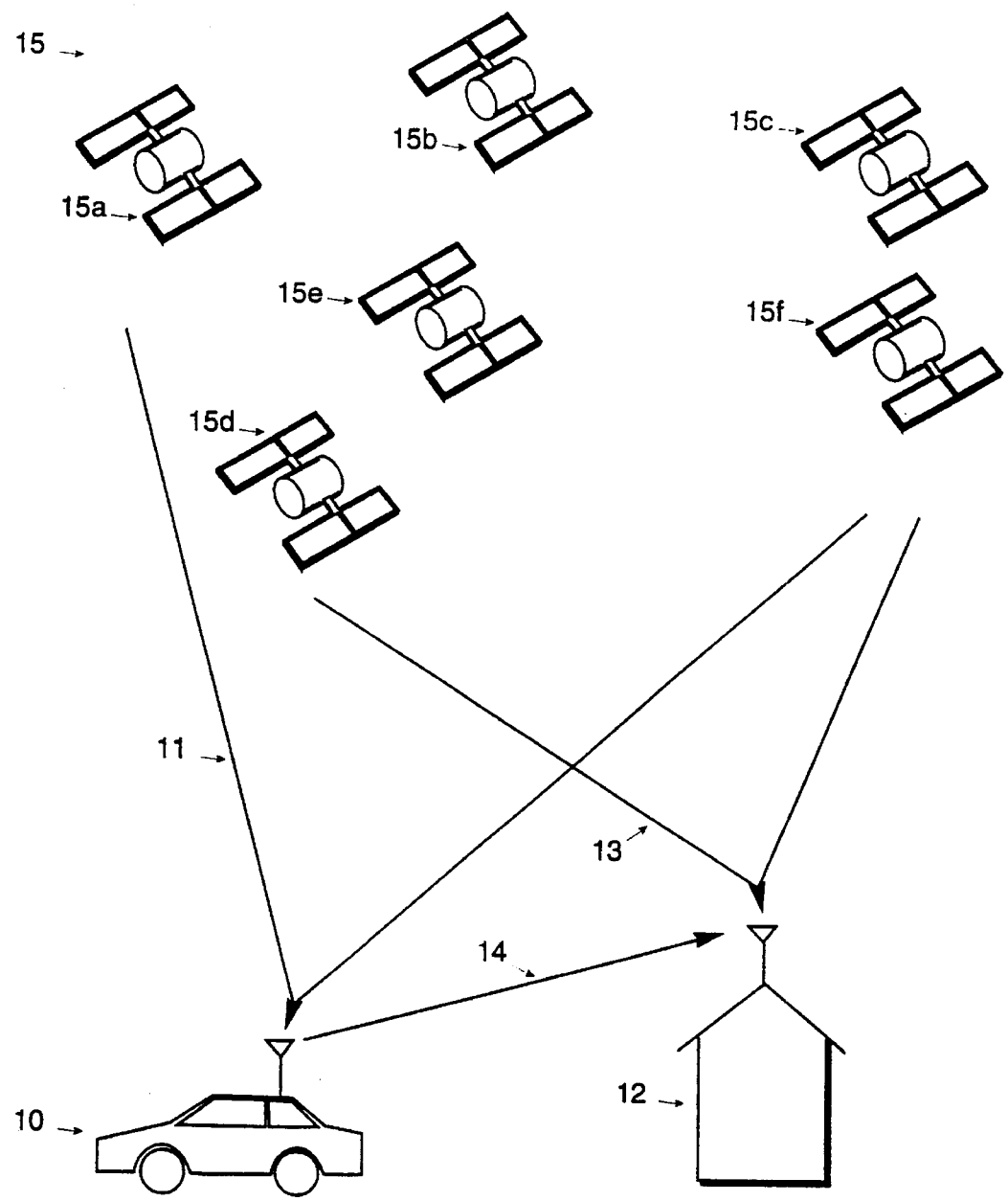
FIG. 1a shows a mobile vehicle separated from a base station and receiving GPS signals from a set of six GPS satellites.
Figure 1B:
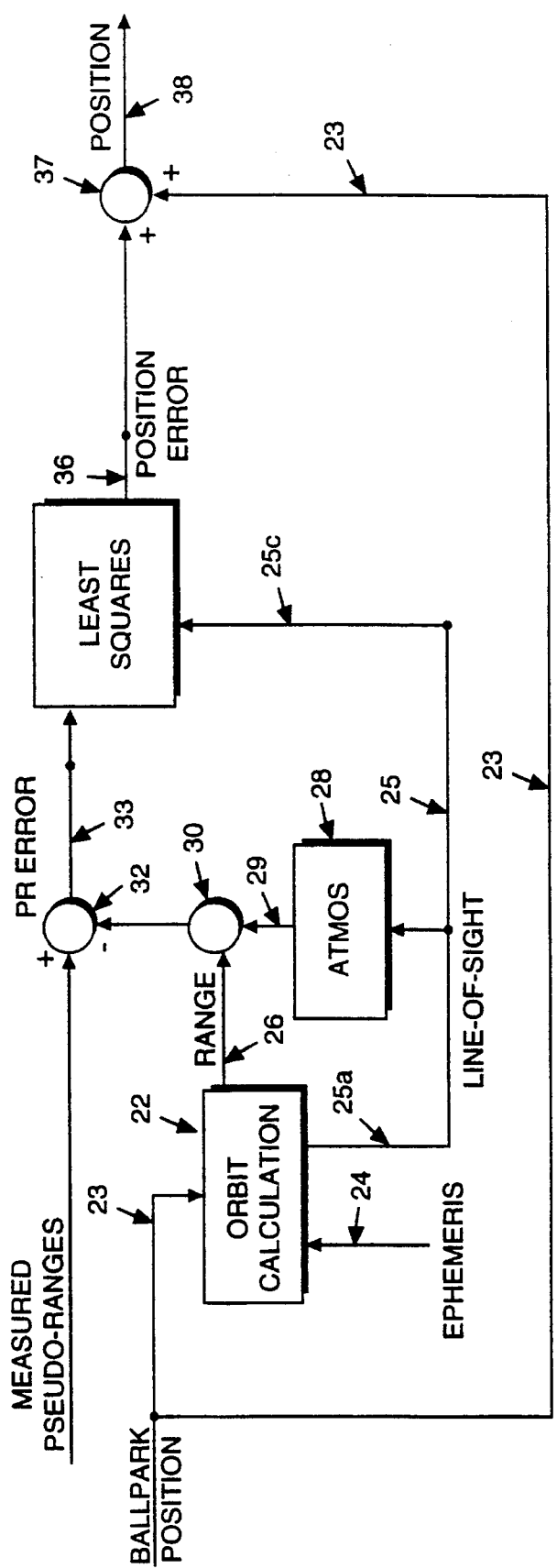
FIG. 1b shows a block diagram of a GPS receiver according to the prior art.

FIG. 1a shows a mobile vehicle 10 receiving satellite signals 11. Mobile vehicle 10 is physically separated from a base station 12, which receives satellite signals 13. Mobile vehicle 10 is additionally capable of transmitting information and signals to base station 12 with respect to its position and other indications, such as for example, six pseudoranges determined from satellites 15a–15f. Mobile vehicle 10 and base station 12 each have a GPS receiver which receives GPS signals through a suitable antenna. In this arrangement, the base station acts as the reference receiver, and mobile vehicle 10 can be termed the rover unit. According to FIG. 1a, mobile vehicle 10 and base station 12 receive GPS signals from a plurality of GPS satellites 15, including first through sixth GPS satellites, respectively designated as satellites 15a through 15f. At any given time, GPS satellites 15a–15f are arbitrarily distributed in the sky. Some of satellites 15a–15f which are recognized by one of the receiving units may not be recognized by the other.

As long as mobile vehicle 10 and base station 12 receive GPS signals from a sufficient number of satellites 15, each can compute its position based upon pseudoranges determined from signals received from satellites 15. Each satellite 15 transmits its identity number, a time signal, predetermined orbital ephemeris corrections, clock errors, drift rates, and other key navigational signals, which are well known and relied upon in the global positioning and navigation arts. A particular GPS receiver establishes the pseudorange to a particular satellite by taking the difference in the time the signal is received using the receiver's own internal clock and the transmitted time and comparing it with the time signal transmitted by the satellite. The receiver's clock error may be large relative to the ranging accuracy required, and for this reason and other inaccuracies, the receiver's ranges so established are termed pseudoranges (PR's). In particular, a pseudorange can be defined as the time of the received signal minus the time of the transmitted signal from a selected satellite, in the GPS receiver's time frame. The receiver time includes the GPS receiver clock offset or error relative to GPS time. In summary, the pseudorange is modeled as being equal to the range to the satellite plus tropospheric and ionospheric delays, plus the receiver clock offset.

According to the invention herein, the system described with respect to FIG. 1a is optimized to reduce the amount of information to be transmitted between stations or stored at one of them for later position determination activity. The actual satellite information taken in by each of the stations is the same as in the prior art. The system invented requires the registration of a sufficient plurality of pseudorange and line-of-sight information sets from available global positioning satellite vehicles in orbit above first and second receiving stations having antennae to receive satellite information relevant to global positioning. As in the prior art, each of the information sets includes a predetermined block of information with respect to both the transmitting satellite and the receiving station listening for the information. The information registered may be stored locally or transmitted in raw or modified form to the other of the receiving stations. There may be more than two receiving stations, and it is contemplated that all or some of the receiving stations will be mobile. When the other of the two or more stations receives information from one of the stations, it is able to make or develop an enhanced position determination for the other station.

Figure 2:
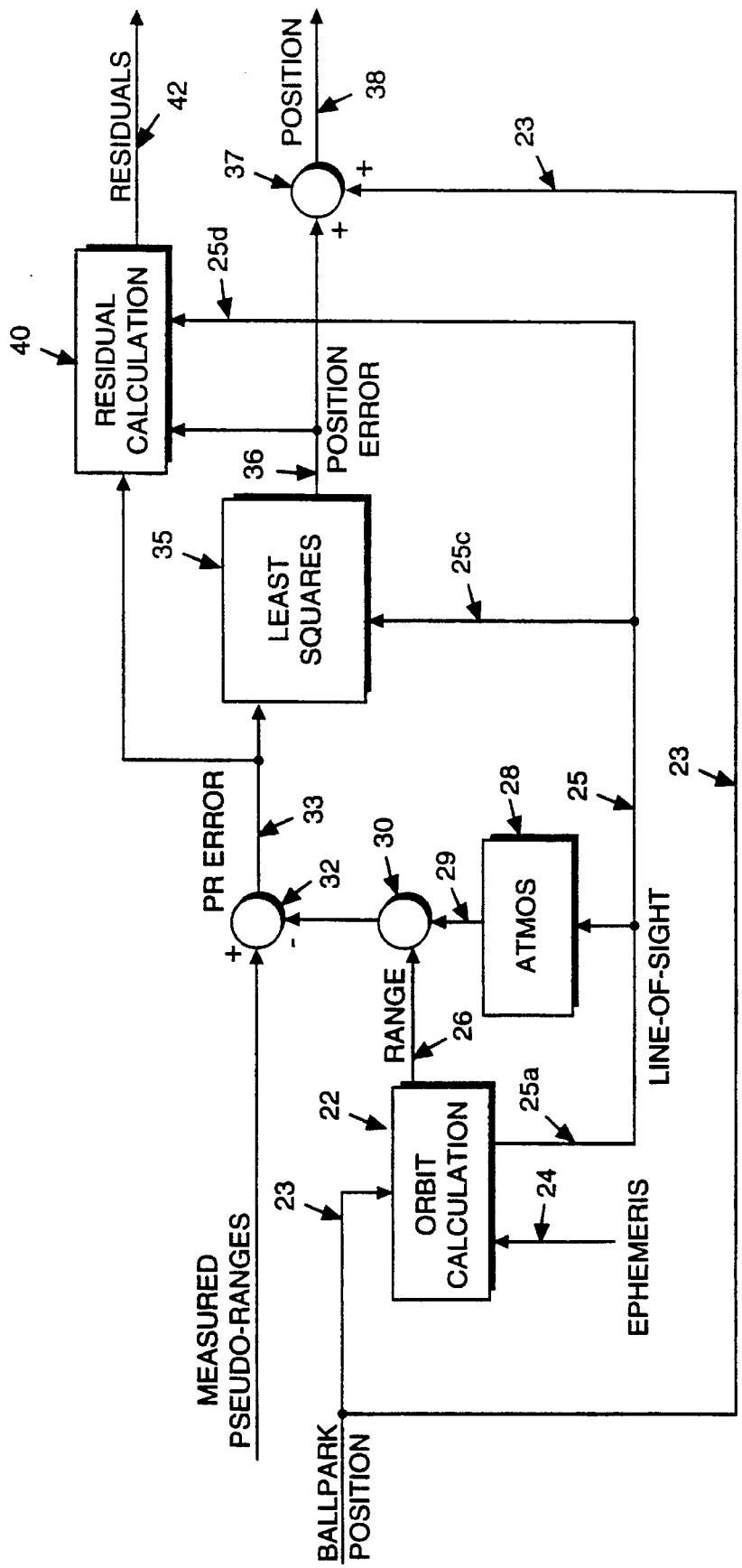
FIG. 2 shows a block diagram of a GPS receiver according to the invention herein, including provision for making a residual calculation.

FIG. 2 shows a block diagram of a GPS receiver 20 according to the invention herein, including provision for making a residual calculation. GPS receiver 20 includes an orbit calculation function 22 based upon a ballpark (initial estimated) position input 23, an ephemeris data input 24, and a line-of-sight input 25a from a line-of-sight input source 25. The orbit calculation function 22 produces an output range indication 26. Line-of-sight input source 25 further provides a line-of-sight input 25b to an ATMOS function 28 which produces an ATMOS output indication 29. GPS receiver 20 further includes a summation function 30 which is effective for adding range indication 26 and ATMOS indication 29 to produce a summation output indication 31.

GPS receiver 20 further includes a subtraction function 32 which is effective for subtracting the summation output indication 31 from each a plurality of measured pseudoranges (PRs). The subtraction function 32 produces a pseudorange error indication 33 for each measured pseudorange, which may collectively be referred to as PR error indications. Line-of-sight input source 25 further provides a line-of-sight input 25c to a least squares function 35. GPS receiver 20 includes least squares function 35, and least squares function 25 receives as inputs, PR error indications 33 and line-of-sight input 25c. Least squares function 25 is effective for producing a position error indication 36 for each of the input measured pseudoranges. Thus, according to the system and method of the invention, a pseudorange error value is produced for each satellite observed by a particular receiving station, based upon the pseudorange information as to each such satellite, a ballpark position value, and corresponding lines-of-sight corrected as to applicable ephemeris and atmospheric conditions.

Least squares function 25 produces position error indications 36 according to the function,

POS ERROR=G*PRE where POS ERROR is a position error vector including pseudorange error values based upon measured pseudoranges and an initial estimated position (i.e., ballpark position estimate), $G=(H^TH)^{-1}*H^T$, an ordinary (as opposed to weighted) least-squares (OLS) gain, PRE is a vector of pseudorange error values which have been produced, H is a matrix of line of sight and time values for "m" lines of sight, the matrix being in m rows and four columns, the first column comprising the x coordinates for all m rows, the second column comprising the y coordinates for all m rows, the third column comprising the z coordinates for all m rows, and the fourth column comprising all 1's; and each row of the matrix comprising x, y, z coordinates for a particular line of sight, and the last element of each row being the number 1; and m is a selected number of lines of sight greater than or equal to five (5) for purposes of the invention herein.

According to this method and system, position error indications are produced for each pseudorange error value produced, based upon a least squares operation relying upon corresponding lines-of-sight with respect to the satellites having the indicated pseudorange error values.

GPS receiver 20 further includes a summation function 37 which is effective for adding ballpark position indications 23 with corresponding position error indications 36 to produce actual position indications 38. Accordingly, a position indication is produced for each position error indication produced, based upon a comparison of said position error indications with said ballpark position.

Figure 3:
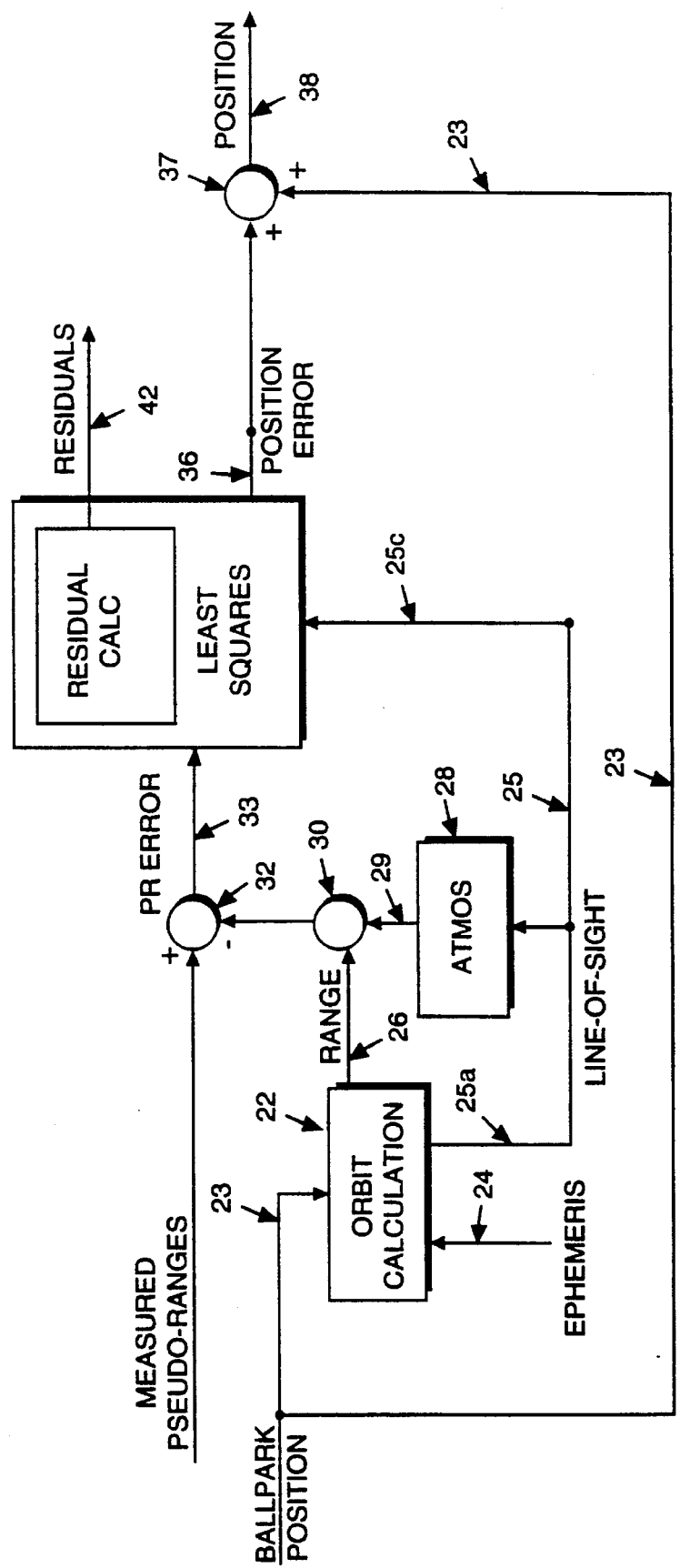
FIG. 3 shows a block diagram of a GPS receiver according to the invention herein, wherein the residual calculation is accomplished as part of a least squares calculation.

GPS receiver 20 further includes a residual calculation function 40 which receives as inputs pseudorange indications 33, line-of-sight inputs 25d from line-of-sight input source 25, and corresponding position error indications 36. The residual calculation function 40 implements the following relationships:

RESID=PRE–H*POS ERROR, as shown in FIG. 2, or equivalently,

RESID=[I–HG]$_{m \times m}$*PRE=K$_{BIG}$*PRE as shown in FIG. 3,
where RESID is the residual value vector corresponding to a plurality of pseudoranges and lines of sight for a measured number of satellites,"m", PRE is a vector of pseudorange error values which have been produced, H is a matrix of line of sight and time values for "m" lines of sight, as defined above, POS ERROR is a position error vector corresponding to the pseudorange error values produced and based upon an initial estimated position (i.e., ballpark position estimate), $G=(H^TH)^{-1}*H^T$, and K$_{BIG}$=[I–HG]$_{m \times m}$.

Thus, RESID=PRE–H*POS ERROR=(I$_{m \times m}$–HG)*PRE= K$_{BIG}$; where K$_{BIG}$ is a large or maximal version of the matrix, K.

The relationship, RESID=PRE–H*POS ERROR, is expressed in FIG. 2, in that the residuals comprising the residual vector, RESID, are produced from input values of the PRE's and the position errors. The residual calculation accordingly involves matrix multiplication of the H matrix with the position error vector and subtracting the result from the pseudorange errors. On the other hand, the relationship, RESID=[I–HG]$_{m \times m}$*PRE=K$_{BIG}$*PRE, is expressed in FIG. 3, wherein the residuals are determined from the lines of sight and the PRE's, the lines of sight being expressed in the K$_{BIG}$ matrix.

As a special case, to develop a modified, i.e., optimized or smallest residual package, we chose a matrix, K$_{SMALL}$, of dimensions (rank×m), where rank is the number of measurements minus four (4), such that:

$KK^T=I_{(rank) \times (rank)}$, and $K(HG)=0$, where K=K$_{SMALL}$.

The values of the modified residuals are equal to K*PRE. H is available from the position calculation performed, as indicated above. In particular, H is an m×n matrix, where, for example, n=4, the number of receiver states (i.e., position and time, with position being stated in three dimensions) and m is the number of satellite measurements made. Accordingly, in one case:

$KK^T=I_{(m-n) \times (m-n)}$, and $KH(H^TH)^{-1}H^T=0$, or according to the well-known Gram-Schmidt decomposition:

$KH=0_{(m-n) \times (n)}$.

Thus, both residual values and modified residual values are produced based upon corresponding values of said pseudorange errors, position error indications, and lines-of-sight, for each of said pseudorange error values produced. According to the invention, a minimized transmission effective for permitting an accurate position determination commensurate with the actual transmission of all measured pseudoranges is accomplished by transmission of a simple position having three components, x, y, and z, and the vector:

$K_{[(m-n) \times (m)]}$*(PSEUDORANGE ERROR)$_{(m \times 1)}$=$O(m-n) \times (n)$, where (PSEUDORANGE ERROR)$_{m \times 1}$=(MEASURED PR–COMPUTED BALLPARK RANGES).

The dimensions of the vector transmitted are: [(m–n)×1]. Accordingly, for six satellite measurements made, a single, three-component or three-element position and two residual values are all that needs to be transmitted, according to the invention.

FIG. 3 shows a block diagram of a GPS receiver according to the invention herein, wherein the residual determination is accomplished as part of a least squares calculation. As already noted:

POS ERROR=G*PRE, where $G=(H^T H)^{-1}*H^T$, for an ordinary least squares operation. The matrix G is also known as the least squares gain matrix. Alternatively, $G=(H^T R^{-1} H)^{-1}*H^T R^{-1}$, for a weighted least squares operation, wherein R is a weighting matrix for the measurements typically equal to the a priori measurement error covariance matrix. Further, RESID=PRE−H*POS ERROR=$(I_{m \times m}-HG)$*PRE=K*PRE.

Consequently, the two relationships, POSERROR=G*PRE and RESID=K*PRE apply and can be expressed in matrix form to permit the position values and residual values to be determined in an integrated operation.

This matrix of relationships can be expressed as follows:

$$\begin{vmatrix} POS\ ERROR \\ \\ \\ RESID \end{vmatrix} = \begin{vmatrix} G \\ \\ \\ K \end{vmatrix} * \begin{vmatrix} PRE_1 \\ . \\ . \\ PRE_m \end{vmatrix}$$

In the matrix equation set forth, G, K, and PRE are known. Accordingly, POS ERROR and RESID are determinable in solving the relationship. Once POS ERROR has been determined, the three estimated position coordinates to be transmitted or stored are available, along with the residual value or values provided.

If five satellites have contributed to development of pseudoranges at a particular mobile station, then three position values, i.e., x, y, and z coordinates, are provided with a single residual value with respect to the initial estimated position.

For larger numbers of satellites, additional residual values are capable of being provided, in accordance with the expression "m−4." Simply stated, the number of residuals which can be provided is the number of satellites "m" less 4. Thus, for six satellites, there will be two residuals; for seven satellites, there will be three residuals, and so on. The position information and the residuals can be transmitted immediately to the stationary receiver 12 from mobile station 10 along radio signal 14, as shown in FIG. 1a.

The invention further comprises storing into a selected memory the information which would alternatively be transmitted to the stationary receiver 12. Local storage could be accomplished within the actual GPS receiver or in an on-board computer. Alternatively, a separate computing device or system could be externally connected to accomplish the same result.

To determine which residuals to transmit to the base station or which residuals to store locally for later use or transmission, any residuals satisfying the relationship, RESID=K*PRE, for $KK^T=I$ and K(HG)=0, can be used. The preferred K is one that is invertible. In particular, a submatrix of $K_{BIG}$, with four of its rows deleted is preferred, so long as the four missing rows of $K_{BIG}$ correspond to four satellites with "good DOP." Good DOP is defined as follows:

$$DOP = \sqrt{trace[[H^T H]^{-1}]}$$

where "trace" is the sum of diagonal elements; and H is defined as before.

Any matrix $K_{p \times m}$, for "m" being the number of satellite measurements and "p" being the number of residuals transmitted or stored (e.g., p=m−4, m−3, m−2, m−1, or m) such that K has rank (m−4) and KH=0 may be used to generate a set of values to transmit that can be reconstructed into residuals by the base station, provided that the base station has the information or is provided the information to reconstruct K at the base station.

The invention includes additionally determining linear combinations of the acquired residual values. One such linear combination of the residual values can be obtained by subtracting one of the residuals from all the other residuals and then simply storing or transmitting the resultant residuals. This could be accomplished by multiplying the residuals by the following matrix:

$$K_{(m-1) \times m} = \begin{vmatrix} -1 & 1 & 0 & 0 & 0 \\ -1 & 0 & 1 & 0 & 0 \\ -1 & 0 & 0 & 1 & 0 \\ -1 & 0 & 0 & 0 & 1 \end{vmatrix}$$

Multiplying the residuals by matrix K would result in a reduced linear combination of the residual values which could be transmitted or stored in lieu of the actual residual values produced.

To summarize, the information transmitted to the base station (or stored at the mobile GPS receiving station) includes three position components (x,y,z), and may include one or more residual values. The information transmitted or stored may be in the form of a residual vector, $\underline{r}=(r_1, r_2, r_3, \ldots, r_m)$. Of these "m" residuals, in accordance with the present invention, all of them may be transmitted or stored. Alternatively, less than "m" of them are transmitted or stored, but in any case, at least "m−4" residuals or their substitutes are sent or stored for later reconstruction as will be discussed below.

In the case of two residuals transmitted (or stored locally) and three position components transmitted, six pseudoranges may be reconstructed. The pseudoranges reconstructed will be relative pseudoranges offset relative to the original pseudoranges. Simply stated, the pseudoranges reconstructed at the base station will be offset from the original pseudoranges developed at the mobile GPS receiving station by a clock component.

To reconstruct the pseudoranges at the base station, the base station computes lines of sight for each of the selected satellites, based upon the rover's position estimates. The lines of sight are computed based upon a known list of satellites, known to both the base station as well as to the rover. Further, the approximate location of the rover is known, in terms of a known RPE (revised position estimate). The lines of sight are calculated by the orbit calculation module in accordance with well-known U.S. Department of Defense (DOD) standards for interface control according to Interface Control Document (ICD) GPS200. These lines of sight are incorporated into a matrix of lines of sight for the user, i.e., the operator in the mobile rover:

$$H_{user} = \begin{vmatrix} los_1 & 1 \\ los_2 & 1 \\ . & . \\ . & . \\ . & . \\ los_m & 1 \end{vmatrix}$$

The base station or the rover accordingly assembles an H matrix based upon lines of sight relying upon the rover's PRE's, and computes G and K matrixes, based upon the relationships:

$G = (H^T H)^{-1} * H^T$, and $K = I - HG$, where

H is the matrix of lines of sight for the user, as indicated above, and the time values for "m" lines of sight are as defined above.

Then, according to one embodiment of the present invention, the base station assembles a matrix, $$\begin{vmatrix} G \\ K \end{vmatrix}$$

wherein the matrix is square (m×m), but K is a partial matrix (m−4)×m.

Next, the base station computes a Z, such that:

$$\begin{vmatrix} \text{POS ERROR} \\ \overline{\text{RESID}} \end{vmatrix} = \begin{vmatrix} G \\ K_{partial} \end{vmatrix} * Z$$

where POS ERROR is a zero vector, $K_{partial}$ comprises the rows of K corresponding to the residuals, and Z is the pseudorange error (PRE) relative to a selected position estimate.

To reconstruct the transmitted full residual vector, $\underline{r}$, the missing four members, for example, $\underline{r}_u$, need to be reconstructed. It is known that the residual vector has the property that:

$H^T \underline{r} = \underline{0}$, where:

$H^T$ is a "4×m" matrix which is the transform of H, the lines of sight matrix, $\underline{r}$ is an "m×1" full residuals vector, $\underline{r}_t * = \text{RESID}_{TRANSMIT}$, $\underline{r}_u = \text{RESID}_{UNKN}$, $$\underline{r} = \underline{r}_t + \underline{r}_u \begin{vmatrix} r_t \\ r_u \end{vmatrix}, \text{ and}$$

$\underline{0}$ is a "4×1" null vector.

$H^T$ may further be restated as two submatrixes, $H^T_t$, and, $H^T_u$, corresponding respectively to the vectors, $\underline{r}_t$ and, $\underline{r}_u$. This restatement permits the relationship above to be rewritten as follows:

$$|H_t^T | H_u^T|_{4 \times m} \begin{vmatrix} r_t \\ r_u \end{vmatrix}_{m \times 4} = \underline{0}_{4 \times 1}.$$

Consequently, $\underline{r}_u$ is recoverable, if $H_u^T$ is invertible.

This invertibility condition is equivalent to picking the four "unsent" or "unstored" residuals to be from a set of fur satellites with good "DOP," as suggested above. Accordingly, the residuals indicated above are reconstructable.

Once the residuals are recovered, a differentially correctable solution containing only satellites visible to the base station can be obtained by adding to the transmitted position, XMITTED POS, the quantiy:

$[H_c^T H_c]^{-1} H_c^T \underline{r}_c$, where subscript "c" refers to the subset of the H matrix including only information from commonly visible satellites, $H_c$ is the matrix of commonly visible satellite lines of sight, and $\underline{r}_c$ is the residuals vector based upon commonly visible satellites.

The advantages of the present invention include a reduction in the amount of data stored or transmitted, in terms of the amounts of bits. For example, the table which follows illustrates the numbers of bits which are transmitted and/or stored in several cases involving different numbers of satellite vehicles (SVs). As can be seen, the amount of bits stored or transmitted is reduced when revised position information and residuals are transmitted or stored as opposed to providing the pseudoranges themselves directly. The table follows:

TABLE B

| NUMBER OF SATELLITE VEHICLE FIXES | TOTAL NUMBER OF BITS OF INFORMATION TRANSMITTED OR STORED | |
|---|---|---|
| | PSEUDORANGES (24 BITS/PR) | REVISED POSITIONS & RESIDUALS |
| 4 | 96 | 66 |
| 5 | 120 | 78 |
| 6 | 144 | 90 |
| 7 | 168 | 102 |
| 8 | 192 | 114 |

What is claimed is:

1. A method for producing a compressed differential global positioning data set at a mobile GPS receiving location, comprising:

receiving GPS signals from at least five GPS signal transmitting satellites at a mobile GPS receiving location, said GPS signals being effective for producing a line-of-sight for each of said at least five GPS signal transmitting satellites;

generating pseudorange values for each of said at least five GPS signal transmitting satellites from corresponding ones of said GPS signals;

producing pseudorange error values corresponding to said pseudorange values, based upon an initial estimated position of said mobile GPS receiving location;

developing position error indications by a least squares operation for each pseudorange error value;

producing a residual value for each of said at least five GPS signal transmitting satellites, based upon corresponding ones of said pseudorange errors, position error indications, and lines-of-sight;

producing a position indication for each position error indication produced, based upon a comparison of said position error indications with said initial estimated position; and transmitting said position indications produced and one of the residual values produced to a second GPS receiving location.

2. A method for producing a compressed differential global positioning data set at a mobile GPS receiving location, comprising:

receiving GPS signals from at least five GPS signal transmitting satellites at a mobile GPS receiving location, said GPS signals being effective for producing a line-of-sight for each of said at least five GPS signal transmitting satellites;

generating pseudorange values for each of said at least five GPS signal transmitting satellites from corresponding ones of said GPS signals;

producing pseudorange error values corresponding to said pseudorange values, based upon an initial estimated position of said mobile GPS receiving location;

developing position error indications by a least squares operation for each pseudorange error value;

producing a residual value for each of said at least five GPS signal transmitting satellites, based upon corresponding ones of said pseudorange errors, position error indications, and lines-of-sight;

producing a position indication for each position error indication produced, based upon a comparison of said position error indications with said initial estimated position; and storing said position indications produced and one of the residual values produced at said mobile GPS receiving location.

3. A method for producing a compressed differential global positioning data set at a mobile GPS receiving location, comprising receiving GPS signals from at least five GPS signal transmitting satellites at a mobile GPS receiving location, said GPS signals being effective for producing a line-of-sight for each of said at least five GPS signal transmitting satellites;

generating pseudorange values for each of said at least five GPS signal transmitting satellites from corresponding ones of said GPS signals;

producing pseudorange error values corresponding to said pseudorange values, based upon an initial estimated position of said mobile GPS receiving location;

developing position error indications by a least squares operation for each pseudorange error value;

producing a residual value for each of said at least five GPS signal transmitting satellites, based upon corresponding ones of said pseudorange errors, position error indications, and lines-of-sight;

producing a position indication for each position error indications produced, based upon a comparison of said position error indications with said initial estimated position; and making a linear combination of residual values for more compact data transmission and storage.

4. The method of claim 3 further comprising transmitting said linear combination and said position indications to a second GPS receiving location.

5. The method of claim 3 further comprising storing into a selected memory said position indications produced and said linear combination.

6. The method of claim 1, further comprising transmitting said position error indications and the initial estimated position to the second GPS receiving location.

7. The method of claim 1, further comprising storing into a selected memory said position error indications, the initial estimated position, and at least one residual value.

8. A position determination system for enabling determination of the position of a mobile GPS receiving station, comprising:

a mobile GPS receiver for receiving GPS signals from at least five GPS signal transmitting satellites at a mobile GPS receiving location, said mobile GPS receiver being effective for producing a line-of-sight for each of said at least five GPS signal transmitting satellites based upon GPS signals received from said at least five GPS signal transmitting satellites;

a pseudorange generator for producing pseudorange values for each of said at least five GPS signal transmitting satellites from corresponding ones of said GPS signals;

means for producing pseudorange error values corresponding to said pseudorange values, based upon an initial estimated position of said mobile GPS receiving location;

means for developing position error indications by a least squares operation for each pseudorange error value;

means for producing a residual value for each of said at least five GPS signal transmitting satellites, based upon corresponding ones of said pseudorange errors, position error indications, and lines-of-sight;

means for producing a position indication for each position error indication produced, based upon a comparison of said position error indications with said initial estimated position; and means for transmitting said position indications produced and one of the residual values produced to a second GPS receiving location.

9. The position determination system of claim 8, further comprising means for storing said position indications produced and one of the residual values produced at said mobile GPS receiving location.

10. The position determination system of claim 8, comprising additionally means for making a linear combination of residual values for more compact data transmission and storage.

11. The position determination system of claim 10, comprising means for transmitting said linear combination and said position indications to a second GPS receiving location.

12. The position determination system of claim 10, comprising means for storing into a selected memory said position indications produced and said linear combination.

13. The position determination system of claim 8, further comprising means for transmitting said position error indications, the initial estimated position, and at least one residual value, to a second GPS receiving location.

14. The position determination system of claim 8, further comprising means for storing into a selected memory said position error indications, the initial estimated position, and at least one residual value.

15. A GPS position determination system for determining the position of a mobile GPS receiving station, comprising:

a mobile GPS receiver for receiving GPS signals from at least five GPS signal transmitting satellites at a mobile GPS receiving location, said mobile GPS receiver being effective for producing a line-of-sight for each of said at least five GPS signal transmitting satellites based upon GPS signals received from said at least five GPS signal transmitting satellites;

a pseudorange generator for producing pseudorange values for each of said at least five GPS signal transmitting satellites from corresponding ones of said GPS signals;

means for producing pseudorange error values corresponding to said pseudorange values, based upon an initial estimated position of said mobile GPS receiving location;

means for developing position error indications by a least squares operation for each pseudorange error value;

means for producing a position indication for each position error indication produced, based upon a comparison of said position error indications with said initial estimated position;

means for producing a residual value for each of said at least five GPS signal transmitting satellites, based upon corresponding ones of said pseudorange errors, position error indications, and lines-of-sight; and a transmitter for transmitting position and residual indications to a second GPS receiving location.

16. The GPS position determination system according to claim 15, wherein said means for producing a residual value for each of said at least five GPS signal transmitting stations is effective for producing linear combinations of said residual values, and said transmitter is effective for transmitting said linear combinations.

17. A GPS position determination system for determining the position of a mobile GPS receiving station, comprising:

a mobile GPS receiver for receiving GPS signals from at least five GPS signal transmitting satellites at a mobile GPS receiving location, said mobile GPS receiver being effective for producing a line-of-sight for each of said at least five GPS signal transmitting satellites based upon GPS signals received from said at least five GPS signal transmitting satellites;

a pseudorange generator for producing pseudorange values for each of said at least five GPS signal transmitting satellites from corresponding ones of said GPS signals;

means for producing pseudorange error values corresponding to said pseudorange values, based upon an initial estimated position of said mobile GPS receiving location;

means for developing position error indications by a least squares operation for each pseudorange error value;

means for producing a position indication for each position error indication produced, based upon a comparison of said position error indications with said initial estimated position;

means for producing a residual value for each of said at least five GPS signal transmitting satellites, based upon corresponding ones of said pseudorange errors, position error indications, and lines-of-sight; and a storage system for storing position and residual indications at a selected memory location.

18. The GPS position determination system according to claim 17, wherein said means for producing a residual value for each of said at least five GPS signal transmitting stations is effective for producing linear combinations of said residual values, and said storage system is effective for storing said linear combinations.

\* \* \* \* \*